United States Patent [19]

Suzuki

[11] Patent Number: 5,652,049
[45] Date of Patent: Jul. 29, 1997

[54] ANTIBACTERIAL COMPOSITE NON-WOVEN FABRIC

[75] Inventor: Migaku Suzuki, Kamakura, Japan

[73] Assignee: Paragon Trade Brands, Inc., Federal Way, Wash.

[21] Appl. No.: 566,364

[22] Filed: Dec. 5, 1995

Related U.S. Application Data

[63] Continuation of Ser. No. 337,617, Nov. 10, 1994, abandoned.

[30] Foreign Application Priority Data

Nov. 15, 1993 [JP] Japan ..................... 5-284950

[51] Int. Cl.$^6$ ................................. B32B 27/00
[52] U.S. Cl. .................. 442/387; 428/206; 428/913; 442/414; 442/417
[58] Field of Search ..................... 428/281, 282, 428/283, 284, 286, 288, 289, 206, 913

[56] References Cited

U.S. PATENT DOCUMENTS

| | | |
|---|---|---|
| 2,693,438 | 11/1954 | Ward . |
| 3,247,058 | 4/1966 | Hyman . |
| 3,728,213 | 4/1973 | Hinz . |
| 3,732,867 | 5/1973 | Money . |
| 3,762,415 | 10/1973 | Morrison . |
| 3,964,486 | 6/1976 | Blaney . |
| 4,128,686 | 12/1978 | Kyle et al. ..................... 428/219 |
| 4,496,358 | 1/1985 | Karami et al. . |
| 4,525,410 | 6/1985 | Hagiwara et al. ..................... 428/198 |
| 4,536,440 | 8/1985 | Berg ..................... 428/284 |
| 4,537,767 | 8/1985 | Rothman et al. . |
| 4,661,101 | 4/1987 | Sustmann . |
| 4,699,823 | 10/1987 | Kellenberger et al. . |
| 4,911,898 | 3/1990 | Hagiwara et al. . |
| 4,911,899 | 3/1990 | Hagiwara et al. . |
| 5,006,339 | 4/1991 | Bargery et al. . |
| 5,057,166 | 10/1991 | Young, Sr. et al. . |
| 5,079,004 | 1/1992 | Blank et al. . |
| 5,087,450 | 2/1992 | Lister . |
| 5,089,205 | 2/1992 | Huang et al. . |
| 5,271,883 | 12/1993 | Timmons et al. ..................... 156/167 |
| 5,290,628 | 3/1994 | Lim et al. ..................... 428/299 |
| 5,300,167 | 4/1994 | Nohr et al. ..................... 264/6 |
| 5,300,192 | 4/1994 | Hansen et al. . |
| 5,308,896 | 5/1994 | Hansen et al. . |
| 5,320,903 | 6/1994 | Hirukawa et al. ..................... 428/364 |
| 5,350,625 | 9/1994 | Peterson et al. ..................... 428/219 |
| 5,356,403 | 10/1994 | Faulks et al. . |

FOREIGN PATENT DOCUMENTS

| | | |
|---|---|---|
| 0 041 934 | 12/1981 | European Pat. Off. . |
| 0 103 214 | 3/1984 | European Pat. Off. . |
| 0 341 951 | 11/1989 | European Pat. Off. . |
| 0 392 528 | 10/1990 | European Pat. Off. . |
| D 11927 | 10/1995 | Japan . |
| WO90/11170 | 10/1990 | WIPO . |
| WO90/11171 | 10/1990 | WIPO . |
| WO90/11181 | 10/1990 | WIPO . |
| WO94/04351 | 3/1994 | WIPO . |

OTHER PUBLICATIONS

Concise English–language translation of Japanese Patent Document D 11927.
New Riverside University Dictionary, The Riverside Publishing Company, 1984, p. 542.

*Primary Examiner*—Kathleen Choi
*Attorney, Agent, or Firm*—Baker & Botts, L.L.P.

[57] ABSTRACT

Composite non-woven fabrics are disclosed. The fabrics comprise at least a first ply that is an antibacterial fibrous web, and a second ply comprising a web of non-woven non-antibacterial fibers serving as a "base structure" providing strength and dimensional stability to the fabric. Each ply adheres strongly to adjacent plies of the fabric by inter-entanglement of the fibers in the respective layers with each other, which defines an intensity gradient of antibacterial property across the thickness dimension of the fabric. The fabrics can be made sufficiently soft and mild for skin contact, and have many uses such as in clothing, medical fabrics, sheets, and the like. The fabrics have the same or a lesser amount of antibacterial fibers than prior-art non-woven antibacterial fabrics without adversely affecting strength, dimensional stability, or antibacterial efficacy.

19 Claims, 2 Drawing Sheets

ANTIBACTERIAL COMPOSITE NON-WOVEN FABRIC

This application is a continuation of application Ser. No. 08/337,617, filed on Nov. 10, 1994, now abandoned.

FIELD OF THE INVENTION

The present invention relates to non-woven fabrics having particular utility in clothing, medical bandages and wipes, bedding, and the like.

BACKGROUND OF THE INVENTION

Antibacterial fabrics have achieved widespread use in various articles including socks, underwear, diapers, bandages, and other uses, and in recent years has been under development as a measure to counter MRSA (methicillin-resistant *Staphylococcus aureus*).

However, technical problems remain to be solved with respect to lowering the cost and increasing the stability of such fabrics, particularly for general use in disposable products, and for ensuring adequate safety and efficacy when used in products intended for skin-contact use. With respect to safety, fibers containing Ag-zeolites, Zr-zeolites or a stable distribution of chitosan particles as effective antibacterial agents, have been shown to be safe and efficacious.

Unfortunately, conventional antibacterial fibers as described above are expensive. Moreover, non-woven fabrics constructed using such fibers alone must have an increased basis weight in order to provide the fabric with sufficient strength for their intended use. Increasing the basis weight results in a further unacceptable increase in cost of the fabrics.

According to the prior art, attempts have been made to provide a suitably strong non-woven fabric with an acceptable antibacterial property, but with little success. In particular, antibacterial fibers have been uniformly mixed with other suitable lesser expensive fibers lacking an antibacterial property, then laid to form a non-woven fabric. In such a case, the proportion of antibacterial fibers in the mixture needs to be higher than about 50% to provide the non-woven fabric with sufficient strength for practical use. Unfortunately, a corresponding proportion of about 50% antibacterial fibers is insufficient to provide an effective antibacterial property to the fabric.

SUMMARY OF THE INVENTION

The aforementioned shortcomings of the prior art are cured by antibacterial composite non-woven fabrics according to the present invention. The fabrics have multiple layers including at least one antibacterial web layer comprising antibacterial fibers, and at least one non-antibacterial web layer comprising non-antibacterial fibers. Each layer adheres strongly to the adjacent layer(s) by inter-entanglement of the fibers in the respective layers with each other. Fiber inter-entanglement also defines an intensity gradient of antibacterial property across the thickness dimension of the composite non-woven fabric.

Antibacterial composite non-woven fabrics according to the present invention exhibit strong antibacterial action and can have a softness suitable for human-skin contact.

The antibacterial action of the fabrics is high relative to prior-art fabrics containing a uniform mixture of antibacterial and non-antibacterial fibers, even though fabrics according to the present invention can have a relative amount of antibacterial fibers no greater than the relative amount of antibacterial fibers found in said prior-art fabrics. Thus, fabrics according to the present invention have an advantageous lower cost without a sacrifice of strength or antibacterial efficacy.

It is thus an object of the present invention to provide an improved antibacterial non-woven fabric which is capable of exhibiting effective antibacterial action during practical use while maintaining physical properties such as softness, strength, and dimensional stability, particularly in a fabric configuration that utilizes a relatively small amount of the antibacterial fibers.

DETAILED DESCRIPTION

The present invention relates to an economical composite non-woven fabric that has suitable structural stability and antibacterial efficacy. The antibacterial non-woven fabric can be advantageously used in various articles such as medical bandages, sheets, clothing, antibacterial wipes, facing sheets for sanitary products, and analogous articles useful for inhibiting spread of infection.

The fabric comprises an antibacterial web layer comprising antibacterial fibers and a non-antibacterial web layer comprising non-antibacterial fibers. The antibacterial and non-antibacterial web layers are "integrated" (i.e., made to adhere strongly to each other) by inter-entanglement of the fibers in adjoining layers with each other. The degree of inter-entanglement is greatest,at layer interfaces. Thus, a gradient of antibacterial efficacy is defined in the thickness dimension of the composite non-woven fabric. I.e., antibacterial efficacy is highest at the major surface of the antibacterial web layer, and progressively weakens through the thickness dimension of the fabric.

The non-antibacterial web layer serves as a "base structure" for the fabric. I.e., the non-antibacterial web layer contributes substantial strength, softness, and dimensional stability to the fabric. The antibacterial web layer, while also contributing strength and dimensional stability, also provides an ability of the fabric to kill bacteria contacting the antibacterial web layer or attempting to pass through it.

The antibacterial and non-antibacterial fibers are inter-entangled with each other at layer interfaces by means such as water-entanglement so that the composite non-woven fabric exhibits overall physical properties as a unitary non-woven fabric. Even though the composite non-woven fabric preferably contains 50% or less of the antibacterial fibers, the fabric exhibits an antibacterial efficacy that is comparable to that of a non-woven fabric comprised entirely of antibacterial fibers. This is because, inter alia, at least a portion (preferably at or near a major surface) of the thickness dimension of the fabric comprises 100% antibacterial fibers.

Figure 1A:
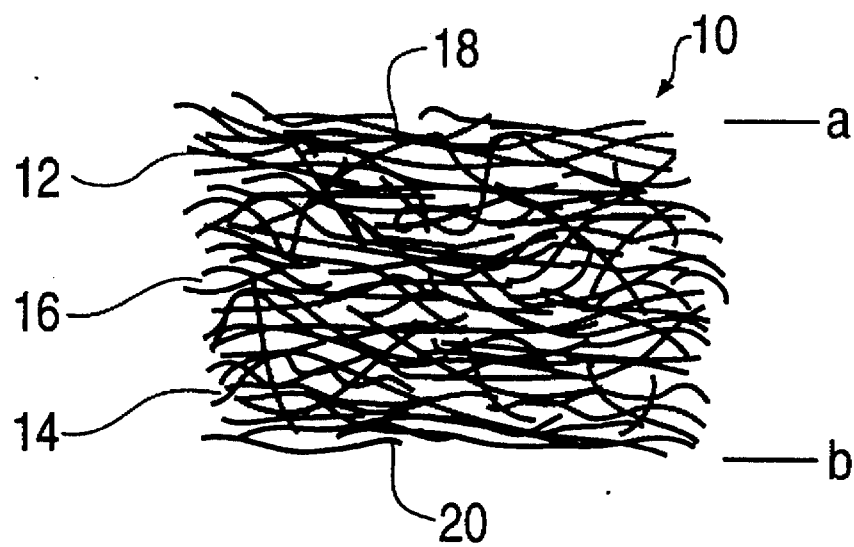
FIG. 1A is a schematic elevational view of a fabric according to the present invention having a single antibacterial layer superposed on a single non-antibacterial layer, wherein the fibers of said layers are inter-entangled at an interface zone between the layers.
Figure 1B:
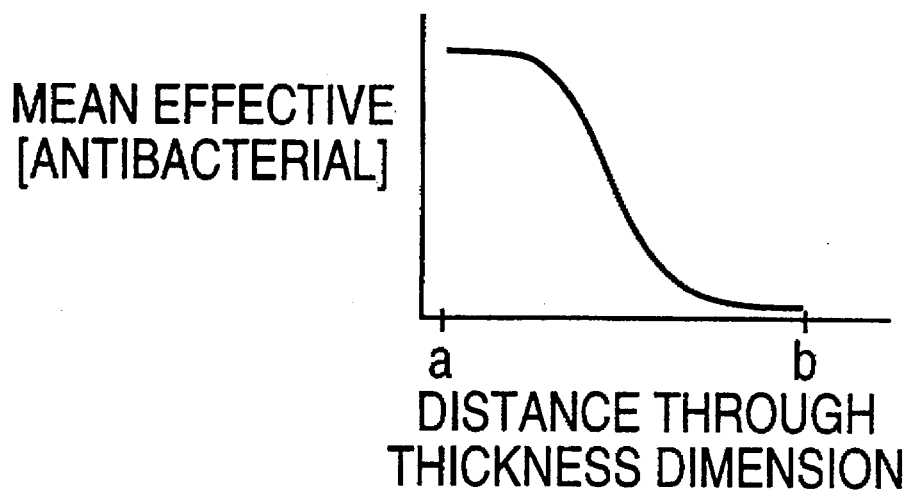
FIG. 1B is a representative plot of the mean effective concentration of antibacterial agent as a function of distance through the thickness dimension of the fabric of FIG. 1A.

A schematic cross-section of a representative non-woven fabric 10 according to the present invention is shown in FIG. 1A. The fabric 10 comprises an antibacterial web layer 12 superposed on a non-antibacterial web layer 14. The non-antibacterial web layer 14 functions as a base structure for the fabric 10, as described above. The antibacterial and non-antibacterial web layers 12, 14 are strongly adhered to each other by inter-entanglement of the fibers of both layers with one another in an interface zone 16 situated in the thickness dimension of the fabric between a first major surface 18 and a second major surface 20. As shown in FIG. 1B, entanglement of the fibers in the interface zone 16 effectively creates a gradient of antibacterial action through the thickness dimension from a to b.

For comparison purposes, non-woven fabrics comprising antibacterial and non-antibacterial fibers uniformly distributed therein according to the prior art exhibit antibacterial properties as shown in Table 1.

TABLE 1

| Proportion of antibacterial fibers | Proportion of non-antibacterial fibers | Antibacterial property |
|---|---|---|
| 20 | 80 | X |
| 40 | 60 | X ~ Δ |
| 60 | 40 | Δ ~ ○ |
| 80 | 20 | ○ |
| 100 | 0 | ⊙ |

X antibacterial property is absent
Δ antibacterial property is slightly present
○ antibacterial property is present
⊙ antibacterial property is intensely present If a non-woven fabric comprised predominantly of antibacterial fibers according to the prior art is to maintain satisfactory physical properties, it needs to have a basis weight of at least 60 g/m$^2$.

In contrast, a composite non-woven fabric according to the present invention can have an overall basis weight of substantially less than 60 g/m$^2$ (such as 40 g/m$^2$, including 15 g/m$^2$ of antibacterial fibers and the remaining weight provided by the base structure) while still exhibiting an antibacterial efficacy substantially equal to that of the prior-art non-woven fabric. Thus, in fabrics according to the present invention, the amount of the antibacterial fibers can be reduced to about ¼ the amount required in prior-art fabrics.

In fabrics according to the present invention, the non-antibacterial base structure can comprise synthetic fibers such as of polyester, polyethylene or polypropylene or cellulosic fibers. Preferably, the fibers in the base structure are "treated" after laying by spunbonding or thermal-bonding to form a non-woven layer, web, or ply. Preferably, but not intended to be limiting, the base structure includes cellulose spunbonded fibers (TCF manufactured by Futamura Chemical Co., Ltd.), polypropylene spunbonded fibers (manufactured by Asahi Chemical Co., Ltd. or Mitsui Petrochemical Co., Ltd.) or polypropylene thermally-bonded fibers (manufactured by Fibertech Corp. or Sandler Corp.), or mixtures thereof.

Any of various antibacterial fibers may be used to form the antibacterial layer, so long as the antibacterial fibers meet safety and efficacy requirements for use in medical or sanitary articles. The preferred antibacterial fibers include, but are not limited to, synthetic fibers containing zeolite particles which incorporate zirconium (Zr) or silver (Ag) ions trapped therein, or cellulosic fibers containing chitosan particles therein, or analogous antibacterial fibers, or mixtures thereof.

To make a composite non-woven fabric according to the present invention, at least one antibacterial web and at least one non-antibacterial web are placed superposedly with respect to each other and strongly adhered to each other. Adhesion is preferably achieved by any suitable means serving to inter-entangle fibers of adjacent layers with each other. Hydro-entanglement is preferred because it not only readily provides a desirable gradient of antibacterial efficacy through the thickness dimension of the fabric, but also can endow the fabric with good drapability. Fabrics having more than one antibacterial layer can be made, for example, by placing first and second antibacterial layers (in which the antibacterial fibers can be the same or different in each layer) on opposite major surfaces of a base-structure layer, then adhering the layers together by means such as hydro-entanglement. In any event, the resulting antibacterial composite non-woven fabric acquires at least one intensity gradient of antibacterial property extending through the thickness dimension of the fabric.

A major criterion for selecting candidate fibers for the antibacterial and non-antibacterial layers is the hydrophobicity or hydrophilicity of the fibers, depending upon the intended use of the composite non-woven fabric. For example, Table 2 representatively shows a relationship between the number of layers and composition of the layers, versus the intended use of the fabric.

In Table 2, reference characters A, B, R, S, respectively, denote the following:

A: polynosic fibers (i.e., improved viscose rayon staple fibers) containing chitosan (manufactured by Fuji Spinning Co., Ltd.)
B: polyester fibers containing Ag-zeolites (manufactured by Kanebo Co., Ltd.)
R: cellulose spunbonded fibers (manufactured by Futamura Chemical Corp.)
S: polypropylene thermally-bonded fibers (manufactured by Fibertech Corp.)

TABLE 2

| | A | | B | |
|---|---|---|---|---|
| | Fabric construction (Layer Profile) | | | |
| | R | S | R | S |
| Two layers | A/R<br>diaper liner<br>topsheet<br>R/A<br>food package | A/S<br>wipes<br>S/A<br>medical drape<br>surgical gown<br>diaper liner<br>topsheet | B/R<br>topsheet<br>diaper liner<br>R/B<br>sheet<br>underwear | B/S(S/B)<br>first-aid protect sheet |
| Three layers | A/R/A<br>wipes<br>gauze<br>underwear | A/S/A<br>wipes<br>gauze<br>surgical | B/R/B<br>wipes<br>food package | B/S/B<br>first-aid protect sheet |

TABLE 2-continued

| A | | B | |
|---|---|---|---|
| Fabric construction (Layer Profile) | | | |
| R | S | R | S |
| | gown<br>medical<br>drape<br>underwear | | (B/S/A)<br>surgical<br>gown<br>medical<br>drape |

(Notes)
A/S: A on a top side
S/A: S on a top side

The present invention further provides a method for manufacturing the above-described composite non-woven fabric. The method comprises the steps of placing at least one non-woven web formed of antibacterial fibers superposedly on at least one non-woven web formed of non-antibacterial fibers; inter-entangling the fibers in the webs such as by pressurized water jet, thereby adhering the webs together; and drying and heat-treating (if necessary) the resulting composite non-woven fabric.

EXAMPLES

The present invention will hereinafter be explained in detail by way of examples.

Example 1

A carded web comprising polypropylene staple fibers (2.2 denier×45 mm) was partially self-bonded by a heat-embossing treatment to prepare a thermally-bonded non-woven first web (basis weight 30 g/m$^2$) intended for use as a base structure.

Antibacterial rayon (polynosic) staple fibers containing chitosan (manufactured and marketed under the trade name "Chitopoly" by Fuji Spinning Co., Ltd.) were formed by conventional means into a carded non-woven second web having a basis weight of 20 g/m$^2$.

The first web was placed on a belt conveyor comprising a 60-mesh stainless-steel net. The second web was placed superposedly on the first web. The webs were then introduced into a conventional water-entangling apparatus provided with water nozzles each having a diameter of 0.10 mm and arranged in a row extending widthwise across the webs. The nozzles were oriented at a pitch of 0.6 mm for jetting water under a pressure of 80 kg/m$^2$ to water-entangle fibers of the first web with fibers of the second web. The resulting composite non-woven fabric exiting the water-entangling apparatus was dewatered and dried by hot air. The composite non-woven fabric (designated as fabric "A" in Tables 3A and 3B, below) had a basis weight of about 50 g/m$^2$, and contained about 40% (relative to total fibers) effective antibacterial fibers.

Figure 2:
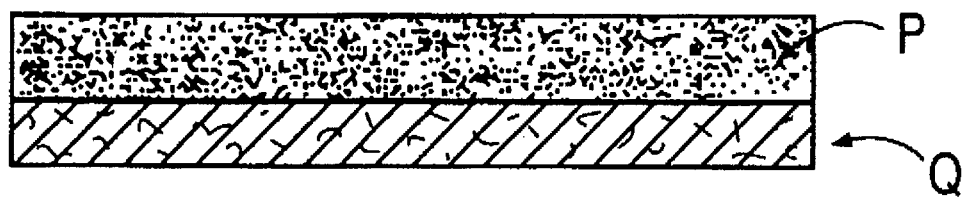
FIG. 2 is a side elevational schematic view of a two-ply antibacterial composite fabric as described in Example 1, wherein "P" denotes a polynosic fibrous web layer containing chitosan, and "Q" denotes a polypropylene thermal-bonded non-woven fibrous web layer.

Fabric "A" is illustrated in FIG. 2 wherein "P" denotes the antibacterial polynosic second web and "Q" denotes the base structure (first web).

Example 2

Two separate non-woven webs of carded antibacterial staple fibers containing chitosan and each having a basis weight of 15 g/m$^2$ were placed superposedly on opposing major surfaces of a non-woven web of thermally-bonded polypropylene fibers prepared as described in Example 1. The three plies were water-entangled, dewatered, and dried by hot air as described in Example 1 to provide an antibacterial composite non-woven fabric (designated as fabric "B" below) having a basis weight of about 60 g/m$^2$. Fabric "B" contained about 50% (relative to total fibers) effective antibacterial fibers.

Figure 3:
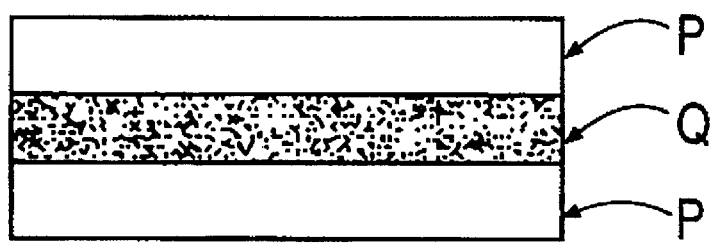
FIG. 3 is a side elevational schematic view of a three-ply antibacterial composite fabric as described in Example 2, wherein "P" and "Q" denote fibrous web layers as described above in FIG. 2.

Fabric "B" is illustrated in FIG. 3 wherein "P" and "Q" are as defined in Example 1.

Comparative Example

A carded non-woven web comprising antibacterial rayon staple fibers as described in Example 1 was water-entangled, dewatered, and dried as described in Example 1 to prepare a single-ply antibacterial non-woven fabric (designated as fabric "a" below) having a basis weight of 50 g/m$^2$. Fabric "a" contained 100% of effective antibacterial fibers.

In addition, the antibacterial rayon staple fibers described above were uniformly mixed with an equal gravimetric amount of non-antibacterial rayon fibers (1.5 denier×35 mm) and wet laid to form a carded non-woven web. The carded web was water-entangled as described above, dewatered, then dried to provide a mixed-type non-woven fabric (designated as fabric "b" below) having a basis weight of 50 g/m$^2$.

For a control, a commercially available rayon non-woven fabric (designated as fabric "c" below) containing no antibacterial fibers was also tested.

The five non-woven fabrics (fabrics "A", "B", "a", "b" and "c") prepared as described above were tested in accordance with a method of bacteria measurement provided by the Council (Japan) of Sanitary Processing of Textile Products. The test results are shown in Tables 3A and 3B. The strain used for the test is Staphylococcus aureus, registration no. IF012732.

TABLE 3A

| Non-woven fabric | Percent antibacterial fibers | Surviving bacterial (cfu) | Log of Surviving Bacteria |
|---|---|---|---|
| A | 40% | 5.13 × 10$^3$ | 3.71 |
| B | 50% | 4.80 × 10$^3$ | 3.68 |
| a | 100% | 4.52 × 10$^3$ | 3.65 |
| b | 50% | 6.55 × 10$^8$ | 8.82 |
| c | 0% | 5.43 × 10$^8$ | 8.74 |

TABLE 3B

| Non-woven fabric | Log Kill Relative to Fabric "c" | Antibacterial effect | Dimensional stability |
|---|---|---|---|
| A | 5.03 | present | high |
| B | 5.06 | present | high |
| a | 5.09 | present | low (high transverse elongation) |
| b | 0.08 | absent | low (high transverse elongation) |
| c | — | absent | low (high transverse elongation) |

The test results as shown in Tables 3A and 3B clearly indicate that Fabrics "A" and "B" according to the present invention, containing only 40% to 50%, respectively, of antibacterial fibers, provide an excellent antibacterial action that is comparable to the antibacterial action of conventional Fabric "a" containing 100% antibacterial fibers. Fabric "b", containing antibacterial fibers uniformly distributed in a web of non-antibacterial fibers, exhibited substantially no antibacterial effect, even though it contained the same percentage of antibacterial fibers as Fabric "B".

Table 3B also shows that, unlike conventional fabric "a" exhibiting substantially the same antibacterial effect, fabrics "A" and "B" according to the present invention exhibit high dimensional stability.

Example 3

A spunbonded non-woven cellulose web (manufactured and sold under the trademark "TCF" by Futamura Chemical Co., Ltd., and having a basis weight of 30 g/m$^2$) was prepared for use as a base structure. Also, polyester fibers containing Ag-zeolites (manufactured and sold under the trademark "Sanitar" by Kuraray Co., Ltd., 1.5 denier×45 mm) were formed into a carded antibacterial web having a basis weight of 30 g/m$^2$.

The spunbonded cellulose web was placed on a belt conveyor comprising a 26-mesh plastic net. The carded antibacterial web was then placed superposedly on the spunbonded cellulose web. The webs were introduced into a water-entangling apparatus provided with nozzles each having a diameter of 0.15 mm and arranged in a row widthwise across the web. The nozzles had a pitch of 1.0 mm and jetted water onto the webs under a pressure of 60 kg/m$^2$ to water-entangle the fibers of the spunbonded cellulose web and the carded web with each other, thereby forming a composite non-woven fabric having a number of openings therethrough.

The composite non-woven fabric was dried by hot air. The fabric had a basis weight of about 60 g/m$^2$ and contained about 50% antibacterial fibers.

The composite non-woven fabric was tested as described in Examples 1 and 2 to ascertain the antibacterial property of the fabric. The fabric exhibited a surviving bacteria count of 2.5×10$^4$ (relative to 5×10$^8$ bacteria surviving in a control web lacking antibacterial fibers). Thus, a satisfactory antibacterial effect was exhibited by the composite non-woven fabric.

The antibacterial composite non-woven fabric described above was used as a topsheet for disposable diapers. In the diapers, the polyester antibacterial ply faced upwardly as for skin contact. In a control diaper, an apertured non-woven fabric comprising regular polyester fibers (with no antibacterial property) and having a basis weight of 30 g/m$^2$ was used as a topsheet. The diapers including the antibacterial ply and the control diapers were respectively worn by 30 middle-sized infants to conduct a comparative test. At the conclusion of the test, the sample diapers were preferred over the comparative diapers by a ratio of 7:3. Also, the sample diapers provided a substantially improved protective effect against diaper rash compared to control diapers.

Thus, antibacterial composite non-woven fabrics according to the present invention are capable of providing antibacterial characteristics sufficient for any of various practical uses, even when the fabrics contain 50% or less antibacterial fibers, without substantial loss of various physical properties, such as strength, dimensional stability, and "hand," required for a non-woven fabric. Fabrics according to the present invention can be advantageously utilized in any of various uses which require an antibacterial characteristic as well as softness. Such uses include, but are not limited to, medical articles, sanitary articles, wipes and the like.

Example 4

A base structure was prepared comprising polypropylene spunbonded fibers (manufactured by Asahi Chemical and having a basis weight of 12 g/m$^2$).

A first non-woven antibacterial web layer was formed comprising carded polynosic fibers and chitosan (manufactured and sold under the trademark "Chitopoly" by Fuji Spinning Co., Ltd.). The fibers were 2.2 denier×45 mm, and the web layer had a basis weight of 30 g/m$^2$.

A second non-woven antibacterial web layer was formed comprising carded polyester fibers and Ag-zeolites (manufactured and sold under the trademark "Saniter" by Kuraray Co., Ltd.). The fibers were 1.5 denier×35 mm, and the web layer had a basis weight of 25 g/m$^2$.

Figure 4:
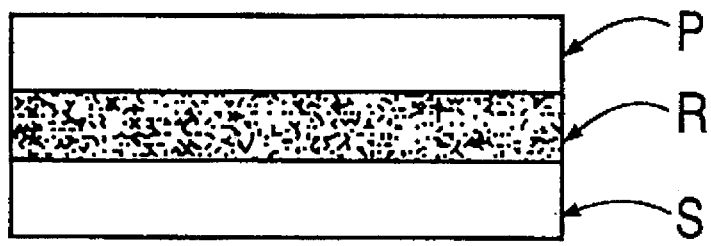
FIG. 4 is a side elevational schematic view of a three-ply antibacterial composite fabric as described in Example 4, wherein "P" denotes a fibrous web layer as described above in FIG. 2, "R" denotes a polypropylene spun-bonded non-woven fibrous web layer, and "S" denotes a polyester fibrous web layer containing Ag-zeolites.

The first non-woven antibacterial web layer was laminated to a first major surface of the base structure by hydro-entanglement as described in Example 1. The second non-woven antibacterial web layer was similarly laminated to a second major surface of the base structure. The resulting composite fabric, shown schematically in FIG. 4, had a basis weight of 70 g/m$^2$. (In FIG. 4, "P" denotes the first antibacterial web layer, "S" denotes the second antibacterial web layer, and "R" denotes the base structure.

An "undershirt" garment was made using this composite non-woven fabric, wherein the "P" layer (which is hydrophilic and non-irritating to skin), faced inwardly toward the wearer's skin, and the "S" layer (which is strongly antibacterial) faced outwardly. Such garments were test-worn for two days by a group consisting of three men and three women. For comparison purposes, conventional knitted cotton undershirts were test-worn as controls for two days by a separate group consisting of three men and three women. At the end of the two-day test period, all shirts were considered soiled, but odor was present only in the control shirts. In addition, whereas all persons wearing the control shirts complained of an "unpleasant" feeling while wearing the shirts, only one person wearing a shirt made according to the present invention reported any unpleasantness.

While the invention has been described in connection with preferred embodiments and examples, it will be understood that the invention is not limited to those embodiments and examples. On the contrary, the invention is intended to encompass all alternatives, modifications, and equivalents as may be included within the spirit and scope of the invention as defined by the appended claims.

What is claimed is:

1. A composite nonwoven fabric comprising:
   a first non-woven web layer comprising antibacterial fibers exhibiting a first antibacterial efficacy; and
   a second non-woven web layer disposed superposedly adjacent the first web layer so as to define a first thickness dimension extending through the first web layer and the second web layer;
   the fibers of the first and second web layers being hydro-entangled with each other so as to adhere the first and second web layers superposedly together and to define a first gradient of the first antibacterial efficacy through the first thickness dimension, wherein the first gradient profiles a progressive weakening of the first antibacterial efficacy from the first web layer through the first thickness dimension.

2. The composite nonwoven fabric of claim 1, wherein the first web layer comprises synthetic fibers.

3. The composite nonwoven fabric of claim 1, wherein the first web layer comprises cellulosic fibers.

4. The composite nonwoven fabric of claim 1 wherein the second web layer comprises fibers selected from a group consisting of synthetic polymeric and cellulosic fibers.

5. The composition nonwoven fabric of claim 2 wherein the fibers of the first web layer comprise Ag- or Zr-zeolites.

6. The composite nonwoven fabric of claim 3, wherein the fibers of the first web layer comprise chitosan.

7. The composite nonwoven fabric of claim 4, wherein the fibers of the second web layer are bonded to each other.

8. The composite nonwoven fabric of claim 1, wherein the fibers of the first and second web layers are hydro-entangled with each other.

9. The composite nonwoven fabric of claim 1, wherein the second web layer comprises non-antibacterial fibers.

10. The composite nonwoven fabric of claim 1, further comprising a third nonwoven web layer superposedly contacting the second web layer opposite the first web layer so as to define a second thickness dimension extending through the second web layer and the third web layer.

11. The composite nonwoven fabric of claim 10, wherein the third nonwoven web layer comprises antibacterial fibers exhibiting a second antibacterial efficacy.

12. The composite nonwoven fabric of claim 11, wherein the fibers of the second and third web layers are hydro-entangled with each other so as to superposedly adhere the second and third web layers together and to define a second gradient of the second antibacterial efficacy through the second thickness dimension, wherein the second gradient profiles a progressive weakening of the second antibacterial efficacy from the third web layer through the second thickness dimension.

13. The composite nonwoven fabric of claim 12, wherein the fibers of the first and second web layers, and the fibers of the second and third web layers, are hydro-entangled with each other.

14. The composite nonwoven fabric of claim 1 comprising 50% or less of the antibacterial fibers.

15. The composite nonwoven fabric of claim 14 wherein the first layer consists essentially of the antibacterial fibers prior to hydro-entanglement with the second layer.

16. The composite nonwoven fabric of claim 1 having a basis weight of less than 60 g/m$^2$.

17. The composite nonwoven fabric of claim 16 having a basis weight of about 40 g/m$^2$.

18. The composite nonwoven fabric of claim 1 wherein, during normal use, the first web layer is in skin contact.

19. A composite nonwoven fabric comprising:

a first non-woven web layer comprising antibacterial fibers exhibiting a first antibacterial efficacy; and a second non-woven web layer that is disposed superposedly adjacent the first web layer so as to define a first thickness dimension extending through the first web layer and the second web layer;

the fibers of the first and second web layers being hydro-entangled with each other so as to adhere the first and second web layers superposedly together and to define a first gradient of the first antibacterial efficacy through the first thickness dimension, wherein the first gradient profiles a progressive weakening of the first antibacterial efficacy from the first web layer through the first thickness dimension;

wherein the composite fabric comprises 50% or less of antibacterial fibers and has a basis weight of less than 60 g/m$^2$.

* * * * *